Aug. 5, 1941.  F. G. LOGAN  2,251,683
REGULATING APPARATUS FOR DYNAMOELECTRIC MACHINES
Filed May 5, 1936
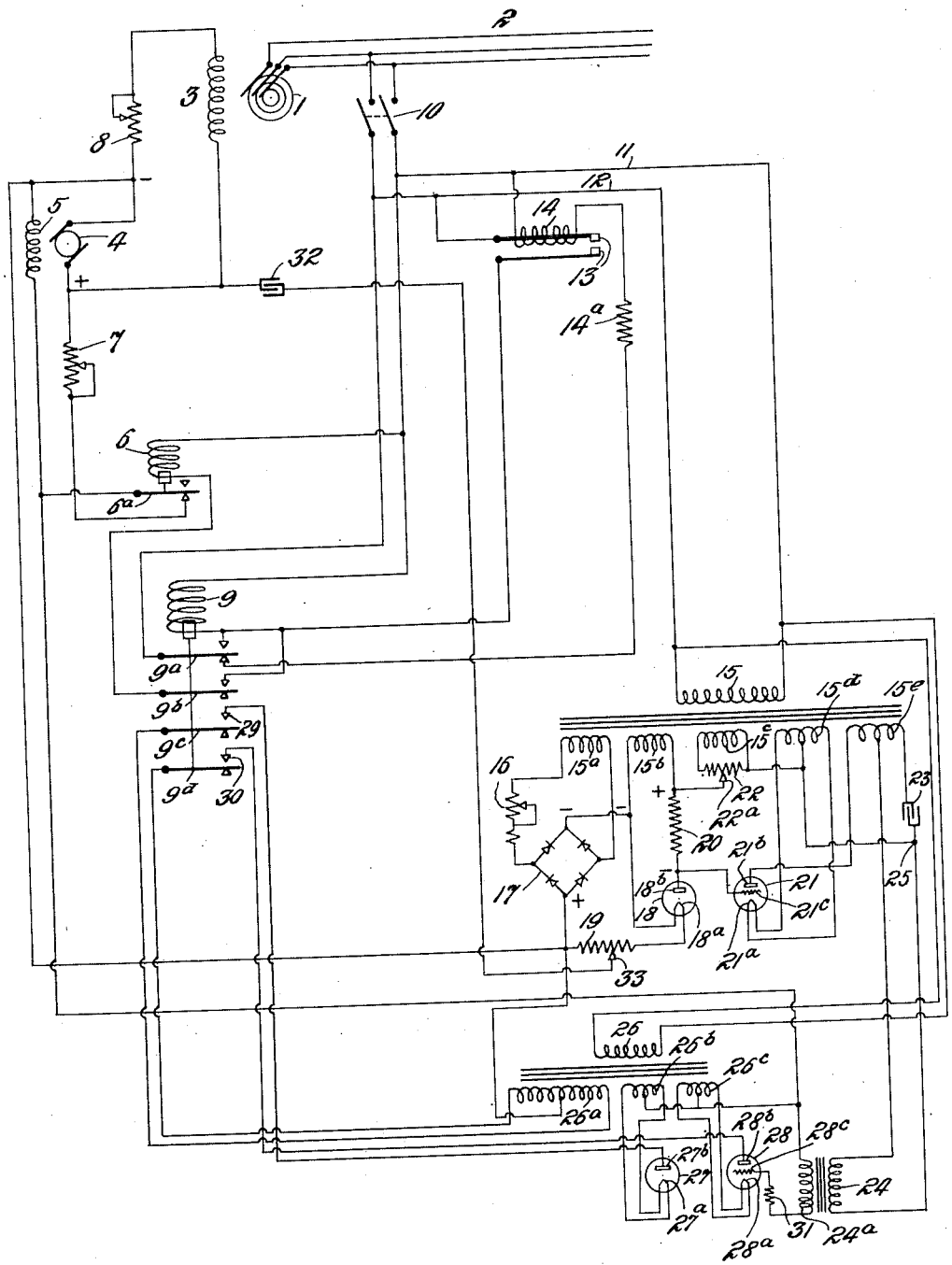
INVENTOR
Frank G. Logan
BY
Lawrence K. Sager
his ATTORNEY Patented Aug. 5, 1941

2,251,683

UNITED STATES PATENT OFFICE 2,251,683

REGULATING APPARATUS FOR DYNAMO-ELECTRIC MACHINES

Frank G. Logan, Mount Vernon, N. Y., assignor to Ward Leonard Electric Company, a corporation of New York Application May 5, 1936, Serial No. 77,931

12 Claims. (Cl. 171—119)

This invention relates to the regulation of dynamo-electric machines having a field winding, the control being accomplished by regulation of the field excitation of the machine. The invention is particularly well adapted to control the output voltage of alternating current generators, although it may be used for the control of other types of machines such as synchronous condensers by adaptation to the particular requirements. The invention also includes the use of improved methods of control.

One of the main objects is to secure quick and effective response to any departure from normal conditions so that the departure, or attempted departure, is promptly counteracted before it is permitted to depart appreciably from normal conditions. Another object is to provide a control which will maintain the machine within close limits of the desired normal condition. Another object is to quickly impose a corrective factor of very high value in response to a comparatively slight departure from normal. Another object is to avoid hunting of the control apparatus. Another object is to secure regulation without the use of any moving parts; and to likewise provide apparatus which requires no special inspection or care. The thermionic tubes used may be as readily replaced, when their effective life has elapsed, as the ordinary lamp bulb in a lighting circuit. Another object is to permit manual adjustment to cause the regulating apparatus to maintain a different constant condition without interrupting the action of the apparatus.

Another object is to provide automatic switch control for placing the regulating apparatus in operation so as to insure the proper sequence of steps and thereby avoid careless or improper operation by the user. Other objects and advantages will be understood from the following description and accompanying drawing.

The drawing is a diagram showing a preferred embodiment of the invention.

The particular application shown is for maintaining substantially constant the ouput voltage of an alternating current generator, regardless of change of load or other conditions which would affect the voltage. A three-phase alternating current generator 1 is indicated delivering current to the supply mains 2. The field winding 3 of the generator is supplied with current from the armature 4 of an exciter having a field winding 5.

When the automatic regulation is not being used, a relay coil 6 is deenergized and its movable contact 6a connected to one terminal of the winding 5 is in its lower position as shown engaging a fixed contact. This contact is connected through a manually adjustable resistance 7 to a terminal of the exciter armature 4, the other terminal of which is connected to a terminal of its field winding 5. Thus when the automatic regulation is not in use, the field winding of the exciter is connected through the resistance 7 in shunt to the armature 4. Manual adjustment of the resistance 7 may be made to cause the exciter to deliver current to the field winding 3 of the generator of such value as will cause the alternator to generate a voltage of about the desired value. A manually adjustable resistance 8 is in series with the field winding 3 of the alternator for obtaining further desired adjustment of the generator voltage. Another relay for controlling the passage from manual to automatic regulation is provided having a winding 9 and a plurality of movable contacts 9a, 9b, 9c and 9d. The movable contacts are adapted to engage fixed contacts as shown when the relay 9 is energized or deenergized, the position of the contacts being shown when the coil 9 is deenergized.

Across a pair of conductors of the three-phase generator is connected a pair of leads 11 and 12 by a switch 10. When the switch is closed, a voltage is imposed upon the conductors 11 and 12 corresponding with the voltage of one phase of the alternator. A thermostatic switch having contacts 13 is provided with a heating coil 14 which envelops a bi-metallic element controlling the movement of the upper contact 13. The upper contact 13 is connected to the lead 12; and the lower contact 13 is connected to one terminal of the relay coil 9, the other terminal of which is connected to the lead 11. Thus when the contacts 13 are closed, the relay 9 is energized. The heating coil 14 has one terminal connected to the lead 11 and the other terminal is connected through a resistance 14a to a fixed contact of the relay switch engaged by the movable contact 9a when the relay coil is deenergized. The latter contact is connected to the lead 12. One terminal of the relay coil 6 is connected to the lead 11 and its other terminal is connected to the movable contact 9b which when the coil 9 is excited engages a contact which is connected to one terminal of the relay coil 9.

At the right of the drawing is indicated a transformer having a primary winding 15 and several secondary windings 15a, 15b, 15c, 15d and 15e. The primary is connected across the leads 11 and 12 and when the switch 10 is closed, is subjected to the voltage of one phase of the generator. The secondary winding 15a is connected to opposite terminals, through an adjustable resistance 16, of a bridge-connected rectifier unit 17 indicated as having individual sections of the copper oxide type connected in the four branches of the bridge so as to give a positive and negative voltage across the other two terminals of the bridge. The resistance 16 is manually adjustable for the purpose of adjusting the output voltage of the generator 1 to give any desired constant voltage. From the upper negative terminal of the bridge 17, connection is made to the cathode 18a of a space discharge tube 18 having an anode 18b. From the cathode, or filament 18a, a return connection is made to the positive terminal of the bridge 17 through a resistance 19.

The secondary winding 15b of the transformer has one terminal connected to the filament 18a and the other terminal connected through a high resistance 20 to the plate 18b of the tube 18. It will thus be seen that any change in voltage of the generator 1 will be reflected in a corresponding change of voltage at the terminals of the bridge-connected rectifier 17 and result in approximately the same proportional change in the value of the direct current delivered through the filament 18a and resistance 19. This change of current through the filament results in correspondingly changing its temperature. The change in temperature causes the resistance of the tube 18 to greatly change giving a greatly amplified variation in the resistance of the plate circuit of the tube upon slight change in voltage of the generator 1. The plate circuit is from one terminal of the secondary 15b through the high resistance 20 to the plate 18b, then to the filament 18a and back to the other terminal of the secondary 15b. The change in current through the high resistance 20 causes a corresponding change in the voltage drop in this resistance, resulting in the potential of the plate 18b being greatly changed in response to a slight departure from normal of the voltage of generator 1.

A three-element space discharge tube 21 is indicated having a cathode or filament 21a, a plate 21b and a grid 21c. The grid is electrically connected to a point between the plate 18b and a terminal of the resistance 20. Thus the grid 21c is subjected to the change of potential imposed upon this point in the manner just described. The secondary winding 15c has its terminals connected to a resistance 22 engaged by an adjustable contact 22a. This contact is connected to a point between one terminal of the secondary 15b and a terminal of the resistance 20. A terminal of the secondary 15c is connected to the mid-point of the secondary winding 15d, the terminals of which supply heating current to the filament 21a. Thus the grid circuit of tube 21 passes from the right-hand terminal of the secondary winding 15c to the mid-point of the secondary 15d and then from its outer terminals to the filament 21a, thence to the grid 21c and thence through resistance 20 to the contact 22a and then through the resistance 22 to the winding 15c. The connections are in such relation that the electromotive force imposed upon this grid circuit by the secondary winding 15c is in opposition as applied to the resistance 20, to the electromotive force across the resistance 20 due to the current in the plate circuit of the tube 18. The purpose of this opposing voltage applied to the resistance 20 is to bias the potential of the grid 21c so as to permit the filament 18a to work in a temperature range which gives the greatest response to change of current in this filament. Adjustment of the contact 22a may be made for imposing the proper bias potential on the grid 21c.

The secondary winding 15e has one terminal connected to the plate 21b of tube 21 while the other terminal is connected through a condenser 23 to one terminal of a primary winding 24 of an insulating transformer. The other terminal of this primary is connected to a mid-point of the secondary winding 15e; and the mid-point of secondary winding 15d is connected to a point 25 in the connection from the condenser 23 to the primary winding 24 of the transformer. It will thus be seen that the circuit from one lead of the secondary 15e passes through a condenser 23 of fixed capacity to the point 25 whereas the circuit from the other lead of the secondary 15e passes to the plate of the tube 21 and through the filament 21a to the secondary 15d and from its mid-point to the point 25. The resistance of this plate circuit varies greatly in response to change of potential of the grid 21c as controlled by the previously described apparatus; and this change of resistance in the plate circuit causes the phase of the potential between point 25 and the mid-tap of the winding 15e to greatly change with reference to the anode potential of a tube 28 in response to a small departure from normal of the voltage of the generator 1. This of course changes the phase of the electromotive force impressed upon the primary 24 of the insulating transformer and correspondingly changes the phase of the electromotive force of the secondary 24a.

Another transformer is shown in the lower portion of the drawing having a primary winding 26 and secondary windings 26a, 26b and 26c. The primary winding is connected across the leads 11 and 12. The secondary 26b has its terminals connected to the cathode 27a of a half-wave rectifier 27; and the secondary 26c has its terminals connected to the cathode 28a of the half-wave rectifier 28. The mid-point of the secondaries 26b and 26c are connected together and to one terminal of the secondary winding 24a and also to a terminal of the exciter field winding 5. The right-hand terminal of the secondary winding 26a is shown connected to the movable contact 9c of the relay controlled by the relay coil 9. When this coil is energized, the movable contact 9c is caused to engage the contact 29 which is connected to the anode 27b of the rectifier 27. The left-hand terminal of the secondary 26a is shown connected to the movable contact 9d of the relay and when the coil 9 is energized, the contact 9d engages the contact 30 which is connected to the anode 28b of the rectifier 28. The mid-point of the secondary 26a is connected to the exciter field winding 5 at the terminal where it is connected to a terminal of the exciter armature 4. The lead from the mid-point of the secondary 26a is electrically connected to a terminal of the resistance 19 so as to have a common potential therewith for the purpose hereinafter explained.

It is evident that the transformer in the lower portion of the drawing will supply the exciting current through the rectifiers to the field winding 5 of the exciter when the switch 10 is closed and the relay coils 6 and 9 are energized. Thus one supply circuit of the exciter winding 5 may be traced from the right-hand terminal of the secondary 26a to the movable contact 9c, contact 29 to anode 27b and then to the cathode 27a to the secondary 26b and thence from its mid-point to one terminal of the field winding 5 and thence back to the mid-point of the secondary 26a.

The circuit from the left-hand terminal of the secondary 26a may be traced to contact 9d, contact 30 and thence to anode 28b, thence to the cathode 28a and through the secondary 26c to a terminal of the field winding 5 and thence from its opposite terminal back to the mid-point of the secondary 26a. Thus the half-wave rectifiers 27 and 28 cooperate to alternately supply current to the exciter field winding 5. The rectifier 28 is provided with a grid 28c which is connected through a resistance 31 to one terminal of the secondary 24a of the insulating transformer, the other terminal of this secondary being connected to the mid-taps of the secondaries 26b and 26c. Thus there is imposed upon the rectifier 28 a grid circuit from the lower terminal of secondary 24a through resistance 31 to the grid 28c and thence to the cathode 28a and through the secondary 26c back to the other terminal of the secondary 24a. As already explained, the phase of the electromotive force of the secondary 24a is shifted widely with reference to the anode voltage of tube 28 in response to a slight change in voltage of the generator 1. This change in phase is imposed upon the grid circuit of tube 28 resulting in a change in output of the tube.

Shifting the phase of the potential of grid 28c with reference to that of the anode 28b in such direction that the effective controlling potential of the grid is quite negative with respect to the anode 28b results in a minimum amount of current flowing in the anode circuit of tube 28 and results in this tube supplying a small amount of current to the exciter field winding 5 during its half-wave period. This small current results in also causing the tube 27 to deliver a small current to the exciter field winding 5 during its half-wave operation. When the phase of the grid 28c is automatically shifted to cause its effective controlling potential to be less negative with respect to the anode 28b potential, the current supplied by the tube 28 to the exciter field winding is correspondingly increased during its active period and likewise causes an increase of current to be delivered to the exciter field winding by rectifier 27 during its half-wave operation. Thus there is not only a change in voltage and current supplied to the field winding of the exciter by the rectifier 28 caused by the shifting of the phase of the grid 28c circuit but there is also a change of voltage and current supplied to the field winding of the exciter by the rectifier 27 in response to the action of the rectifier 28. It is evident from the operation of the apparatus disclosed that a slight change in voltage of the generator results in a very greatly amplified change in the voltage and current applied to the field winding of the exciter, giving a very pronounced counteracting effect upon the exciter field winding in response to any tendency of departure from normal voltage of the generator 1. Moreover by reason of the character of the apparatus utilized, the corrective effect applied to the field winding of the exciter is almost instantaneous in its action upon the occurrence of any slight departure from normal of the generator voltage, and the rate of change of the armature exciter voltage is determined by the adjustment of the hereinafter explained anti-hunting circuit which is dependent upon the electrical constants of the controlled machine. In this way correction of the controlled alternating current voltage is accomplished while maintaining the electrical stability of the system.

The corrective effect without the provision of anti-hunting means is so great that it would tend to over-correct the departure from normal voltage which in turn would result in a pronounced counteracting effect and cause hunting. This invention therefore includes the provision of an anti-hunting control. This is accomplished by means of a simple character which has no moving parts. For this purpose a condenser 32 is connected between one terminal of the exciter armature 4 and the contact 33 which adjustably engages the resistance 19. This applies an electromotive force to a portion of the resistance 19 which is responsive to change of voltage of the exciter armature 4, by a circuit which passes from the lower positive terminal of the armature 4 through the condenser 32 to the contact 33 and through the left-hand portion of the resistance 19 back to the negative terminal of the armature 34. This momentary condenser discharge voltage impressed on the resistance 19 will act to oppose the voltage applied to resistance 19 by the bridge rectifier unit 17 when the voltage of the exciter armature 4 is rapidly decreasing. It will thus oppose and tend to choke the effect of the action of the control apparatus when it acts to decrease the voltage of the exciter and the voltage of the alternator 1. The opposition of this condenser discharge voltage to the voltage of the rectifier circuit will be apparent by noting that the circuit from the positive terminal of the rectifier unit 17 passes from left to right through the resistance 19 and through the tube 18, resistance 20, secondary winding 15b and then to the negative terminal of the rectifier unit 17; but the condenser voltage impressed on a portion of the resistance 19 when the voltage of the exciter armature is decreasing, is in opposition to the rectifier circuit voltage owing to the direction of discharge of the condenser 32. When however the control apparatus is acting to increase the voltage of the generator 1 by greatly raising the voltage applied to the exciter field winding, the resultant rapid increasing voltage of the exciter armature causes a voltage to be impressed by the condenser circuit on a portion of the resistance 19 in the opposite direction from that previously considered because the condenser is then being charged. In that event the condenser circuit voltage acts in a direction to aid the voltage of the circuit of the rectifier 17 and thus tends to counteract the action of the control apparatus in raising the voltage of the exciter armature. This counteracting effect of the anti-hunting means results from the rapid change of current in the field winding 5 of the exciter as affected by the control apparatus with the result that any change imposed in each direction is dampened and hunting is avoided. It will be appreciated that the opposing or aiding voltage resulting from the action of the condenser on the resistance 19, correspondingly affects the heating of the filament 18a and in that way dampens the change of current in the circuit of the tube 18 through the resistance 20. It will also be understood that by providing a direct current for this control circuit containing the resistance 19, it permits the action of the condenser circuit to act with or in opposition to the voltage of the direct current control circuit and thus serves to accomplish the damping of the attempted change in both directions, that is, when the voltage of the generator is to be raised as well as when it is to be lowered. Furthermore, by reason of the change of current through the control circuit of the element or filament 18a being changed in response to change of the voltage applied thereto in approximately the same proportion, a comparatively small change in the voltage of the exciter armature serves to effectively dampen the control current and thereby effectively avoids hunting. Adjustment of contact 33 permits the anti-hunting effect to be made the proper amount for obtaining the best results.

Under manual control, the switch 10 is open and the relay coils 6 and 9 are deenergized and the thermostatic contacts 13 are separated. The contact 6a is then in its lower position as shown and the field winding 5 of the exciter is in shunt to the armature 4 through the field rheostat 7. The main field rheostat 8 of the main generator is manually adjusted to its proper amount and the field rheostat 7 of the exciter is likewise adjusted to its proper amount to give the desired generator voltage.

When automatic control for maintaining the generator voltage within close limits is desired, it is merely necessary to close the switch 10. This closes a circuit from the lead 11 through the heating coil 14 and resistance 14a and through movable contact 9a back to lead 12; but the contacts 13 are not closed until a certain time interval has elapsed required to heat the bi-metallic strip. In the meantime current is supplied to the primary windings 15 and 26 of the transformers which results in the passage of heating currents through the filaments 18a, 21a, 27a and 28a. The time interval before closure of the thermostatic switch contacts 13 is such as to allow these filaments or cathodes to be sufficiently heated in order to insure proper operation of the control apparatus. Upon expiration of this time interval, the contacts 13 are closed which closes a circuit from lead 12 through contacts 13 and through relay coil 9 back to lead 11. This causes the movable contacts 9a and 9b of the relay to be shifted from the position shown to engage the upper contacts. The raising of the contact 9a causes it to engage a contact connected to one terminal of the relay coil 9 so that a circuit is closed from lead 12 through contact 9a and through coil 9 back to lead 11. Thus coil 9 will continue to remain energized independently of the circuit through the contacts 13. The movement of contact 9a from its lower contact, breaks the circuit through the heating coil 14 permitting it to cool and open the contacts 13.

The energizing of coil 9 also causes the movable contacts 9c and 9d to engage the fixed contacts 29 and 30 which thereby causes the field winding 5 of the exciter to be supplied with current from the automatic control apparatus. This control is momentarily in parallel with the previously adjusted manual control circuit as regards supplying current to the exciter field winding. Although the energization of the relay coil 9 causes the movable contact 9b to engage its upper contact and thereby connect the relay 6 across the leads 11 and 12, the action of the relay coil 6 is subsequent to that of relay 9 and thus will not break the manual control circuit or the exciter field winding by raising the contact 6a, until a momentary period after the relay 9 has moved its contacts to the operating control position. Thus the circuit of the exciter field is not opened in making the transfer from manual to automatic operation.

Upon the movement of the contact 6a by the relay coil 6 the exciter field winding is then subjected to automatic control only. The action of this automatic control has already been explained in the function of its different parts and it is evident that upon any slight increase above normal in the generator voltage the current through the heating filament 18a is increased, resulting in an increase in the drop in volts in resistance 20 which correspondingly affects the potential of the grid 21c. This changes the resistance of the circuit of tube 21 and shifts the phase of the voltage and current supplied to the insulating transformer. The direction of this shift in phase is made such as to decrease the output of the half-wave rectifier 28 and to also decrease the output of rectifier 27 to the field winding 5 of the exciter. The action of this apparatus is almost instantaneous and greatly amplified in its effect upon the field winding of the exciter upon slight change of generator voltage, as already explained. The decrease in excitation of the exciter will of course decrease the current through the generator field winding 3 and thus reduce the generator voltage to normal. During this action the condenser 32 takes its part in preventing hunting by imposing a voltage upon resistance 19 in a direction to decrease the current in the filament 18a and thereby dampen the action of the control apparatus, as already explained.

Upon decrease of the generator voltage below normal, the output of the rectifier 17 is decreased and the heating of the filament 18a is lessened which results in affecting the potential of the tube of the grid 21c so as to change the resistance of the circuit of its tube and cause the phase of the potential of the grid 28c to be shifted in such a direction as to raise the output of rectifier 28 and also the output of rectifier 27. This sharply increases the voltage and current applied to the field winding of the exciter. This of course increases the current supplied to the generator field and raises the generator voltage to normal. During this action, the condenser 32 will permit a discharge through its circuit in such a direction as to increase the current in the circuit of filament 18a and thereby tend to increase its heating effect and dampen the corrective action.

During the operation of the automatic control apparatus, the voltage to be maintained by the generator may be adjusted to a different value at any time by manual movement of the adjustable contact of the resistance 16. This will change the current delivered by the rectifier 17 to a different value and thereby cause the main generator voltage to be maintained at a different normal value.

Whenever it is desired to discontinue the automatic control, the switch 10 may be opened. This deenergizes the relay coils 6 and 9 which causes the contacts to return to the position shown in the drawing whereupon the field winding of the exciter is placed in a shunt circuit with the armature of the exciter. The exciter then supplies the field winding 3 of the main generator without the automatic control under the previously adjusted conditions for non-automatic operation. It will also be understood that if at any time from any special cause, the load of the main generator should exceed the range of control of the automatic regulator, the voltage applied to the relay coils 6 and 9 will then be insufficient to retain their contacts in the position for automatic control and the relay contacts would return to the position shown in the drawing, whereupon the voltage will be subject to manual control until the special condition causing the abnormal drop in generator voltage has been remedied.

Although a particular embodiment of the invention has been described, various other applications thereof may be made; also the different features of the invention may be likewise applied to other purposes according to the particular requirements and the particular character of control required. It will also be understood that the devices used may be of any other suitable type or form than those indicated and that various modifications may be made without departing from the scope of the invention.

I claim:

1. The combination of a dynamo electric machine having a field winding, and means for controlling the current in said field winding comprising a space discharge device having an anode and cathode, and anti-hunting means responsive to change affecting said field winding for affecting the heating of said cathode to oppose the change affecting said field winding.

2. The combination of a dynamo electric machine having a field winding, and means for controlling the current in said field winding comprising a space discharge device having an anode and cathode, a source of direct current in circuit with said cathode for controlling the heating of said cathode, and anti-hunting means responsive to change affecting said field winding for imposing an electromotive force on said circuit for damping the change affecting said field winding.

3. The combination of a dynamo electric machine having a field winding, and means for controlling the current in said field winding comprising a space discharge device having an anode and cathode, a source of direct current in circuit with said cathode for controlling the heating of said cathode, and anti-hunting means responsive to change affecting said field winding for imposing an electromotive force on said circuit in a direction opposing and aiding said source according to requirements for damping the change affecting said field winding.

4. The combination of an alternating current generator having a field winding, an exciter for supplying current to said field winding, and automatic means for supplying current to the field winding of the exciter for regulating the voltage of the generator comprising a rectifier responsive to change of voltage of said generator, a space discharge device having an anode and a cathode, said cathode being supplied with heating current from said rectifier, a resistance in the plate circuit of said device, a three-element space discharge device one element of which is subjected to change of potential determined by the change of drop in volts in said resistance, means for biasing the potential of said element, a pair of half-wave rectifiers supplied with energy derived from said generator for supplying controlling current to the field winding of said exciter, and means responsive to change of potential of said element for changing the current supplied by said rectifiers to said exciter field winding.

5. The combination of an alternating current generator having a field winding, an exciter for supplying current to said field winding, and automatic means for supplying current to the field winding of the exciter for regulating the voltage of the generator comprising a rectifier responsive to change of voltage of said generator, a space discharge device having an anode and a cathode, said cathode being supplied with heating current from said rectifier, a resistance in the plate circuit of said device, a three-element space discharge device one element of which is subjected to change of potential determined by the change of drop in volts in said resistance, means for biasing the potential of said element, a pair of half-wave rectifiers supplied with energy derived from said generator for supplying controlling current to the field winding of said exciter, means responsive to change of potential of said element for changing the current supplied by said rectifiers to said exciter field winding, and anti-hunting means for imposing an aiding and opposing voltage upon the circuit of said cathode for damping the change of current in said exciter field winding.

6. The combination of a generator having a field winding, an exciter for supplying current to said field winding, and automatic means for supplying current to the field winding of the exciter for regulating the voltage of the generator comprising a space discharge device having an anode and a cathode, said cathode being supplied with heating current derived from said generator and responsive to change of voltage of said generator, a resistance in the plate circuit of said device, a three-element space discharge device one element of which is subjected to change of potential determined by the change of drop in volts in said resistance, means for biasing the potential of said element, a pair of half-wave rectifiers supplied with energy derived from said generator for supplying controlling current to the field winding of said exciter, and means responsive to change of potential of said element for changing the current supplied by said rectifiers to said exciter field winding.

7. The combination of a dynamo-electric machine having a field winding, manual means for adjusting the current in said field winding, means for automatically controlling the current supplied to said field winding comprising a space discharge device having an anode and cathode, a manual switch for controlling the supply of current to said means for heating said cathode, a thermostatic switch having a heating element controlled by said manual switch, a relay energized by the closing of said thermostatic switch for connecting said automatic means to said field winding, and means controlled by the energization of said relay for deenergizing the said heating element and for closing a circuit through said manual switch and the winding of said relay and for opening the field circuit of said manual means.

8. The combination of a dynamo-electric machine having a field winding, a circuit for said field winding, manual means connected to the field winding circuit for adjusting the current in said field winding, means for automatically controlling the current in said field winding, a manual switch, a relay controlled by said switch for connecting said automatic means to said field winding, and a second relay controlled by said first named relay for opening the field circuit connected to said manual means after closing the circuit of said automatic means to said field winding by said first named relay.

9. The combination of a dynamo-electric machine having a field winding, means for automatically controlling the current supplied to said field winding comprising a space discharge device having an anode and cathode, a circuit for energizing said cathode, a manual switch for controlling the supply of current to said cathode energizing circuit, a thermostatic switch having a heating element controlled by said manual switch, a relay energized by the closing of said thermostatic switch for connecting said automatic means to said field winding, and means controlled by the operation of said relay for deenergizing the said heating element and for closing a circuit through said manual switch and the winding of said relay.

10. The combination of a dynamo-electric machine having a field winding, means for automatically controlling the current supplied to said field winding comprising a space discharge device having an anode and cathode, a circuit for energizing said cathode, a manual switch for controlling the supply of current to said cathode energizing circuit, a time delay switch having an energizing circuit controlled by said manual switch, a relay energized by the closing of said time delay switch for connecting said automatic means to said field winding, and means controlled by the operation of said relay for deenergizing the said time delay switch and for closing a circuit through said manual switch and the winding of said relay.

11. The combination of an alternating current generator, an exciter for said generator having a field winding, a thermionic rectifier having an input circuit connected to the output circuit of said generator, a circuit for supplying current to the cathode of said rectifier from said generator, an electrically operable switch having an energizing circuit, a time delay relay for controlling the energizing circuit of said switch and having an energizing circuit connected to said cathode supply circuit, means controlled by said switch in released position for supplying the entire energizing current for said field winding from the armature of said exciter, and means controlled by said switch in operated position for supplying at least a portion of the current to said field winding from said rectifier.

12. The combination of an alternating current generator having a field winding, an exciter for supplying current to said field winding, and automatic means for controlling the supply of current to the field winding of the exciter for regulating the voltage of the generator comprising a rectifier subjected to a voltage derived from and variable with change of voltage of a generator, said circuit supplied with direct current from said rectifier varying in accordance with change of said voltage, a current responsive element connected in series in said circuit and subjected to such change of current delivered by said rectifier for controlling other portions of said means for regulating the voltage of said generator, and means for damping change in the exciter field current by impressing on said circuit of said element a transient voltage responsive to change in voltage of the exciter armature for affecting the current in said element.

FRANK G. LOGAN.

CERTIFICATE OF CORRECTION.

Patent No. 2,251,683.  August 5, 1941.

FRANK G. LOGAN.

It is hereby certified that error appears in the printed specification of the above numbered patent requiring correction as follows: Page 6, second column, lines 19 and 20, claim 12, for "a generator, said circuit" read --said generator; a circuit--; and that the said Letters Patent should be read with this correction therein that the same may conform to the record of the case in the Patent Office.

Signed and sealed this 30th day of September, A. D. 1941.

(Seal)
Henry Van Arsdale,
Acting Commissioner of Patents.